United States Patent

Sasaki et al.

[11] Patent Number: 5,305,227
[45] Date of Patent: Apr. 19, 1994

[54] GEAR PITCH ERROR CORRECTING SYSTEM FOR NUMERICAL CONTROL APPARATUS

[75] Inventors: Takao Sasaki, Hachioji; Kentaro Fujibayashi, Musashino; Toshiaki Otsuki, Hino; Ryouji Eguchi, Yamanashi, all of Japan

[73] Assignee: Fanuc Limited, Yamanashi, Japan

[21] Appl. No.: 776,379

[22] Filed: Nov. 26, 1991

[30] Foreign Application Priority Data

Apr. 5, 1990 [JP] Japan .................................. 2-91314

[51] Int. Cl.$^5$ ............................................. G06F 11/30
[52] U.S. Cl. ........................... 364/474.35; 364/474.31; 364/474.18
[58] Field of Search ............... 364/474.35, 474.15, 364/474.01, 474.31, 474.18; 73/862.328, 862.326, 862.325; 33/501.7, 501.8, 501.9

[56] References Cited

U.S. PATENT DOCUMENTS

| | | | |
|---|---|---|---|
| 3,461,456 | 8/1969 | Höfler | 33/501.7 X |
| 4,502,108 | 2/1985 | Nozawa et al. | 364/175 X |
| 4,893,971 | 1/1990 | Watanabe et al. | 364/474.01 X |
| 4,942,611 | 7/1990 | Kunugi et al. | 364/474.35 X |
| 4,945,501 | 7/1990 | Bell et al. | 364/474.35 X |
| 4,974,165 | 11/1990 | Locke et al. | 364/474.35 |

Primary Examiner—Jerry Smith
Assistant Examiner—Brian C. Oakes
Attorney, Agent, or Firm—Staas & Halsey

[57] ABSTRACT

A gear pitch error correcting system for a numerical control apparatus used for a machine tool including at least one pair of gears provided in a transmission line through which the rotating force of a servomotor is transmitted to a driven member. Gear pitch error correction values for the respective gears, which each correspond to a predetermined gear angle and collectively cover one gear rotation, are stored in a nonvolatile memory. A pitch error computing means (E) refers to a current position register (D), reads out pitch error correction data (14b) corresponding to the current position from the nonvolatile memory, and adds up the data to obtain a superimposed pitch error correction value. The superimposed pitch error correction value and an interpolation pulse from an interpolating means (B) are added together by an adder (C), to obtain a pitch error-corrected output pulse, which is then supplied to an axis control circuit (18). Accordingly, even with a relatively small number of gear pitch error correction values for the individual gears, a gear pitch error correction can be precisely executed in proportion to the superimposing of the gear pitch error correction values.

6 Claims, 7 Drawing Sheets

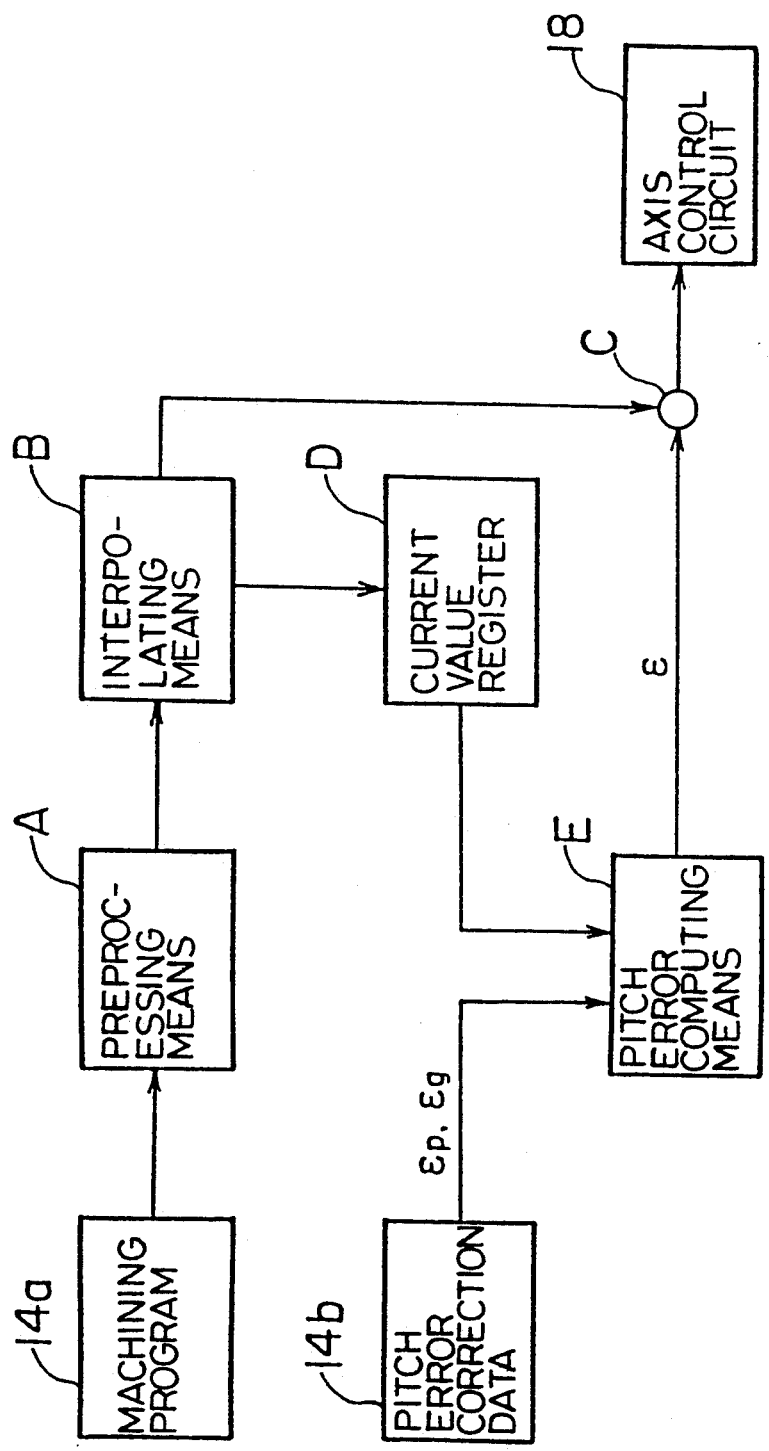
F I G. 1

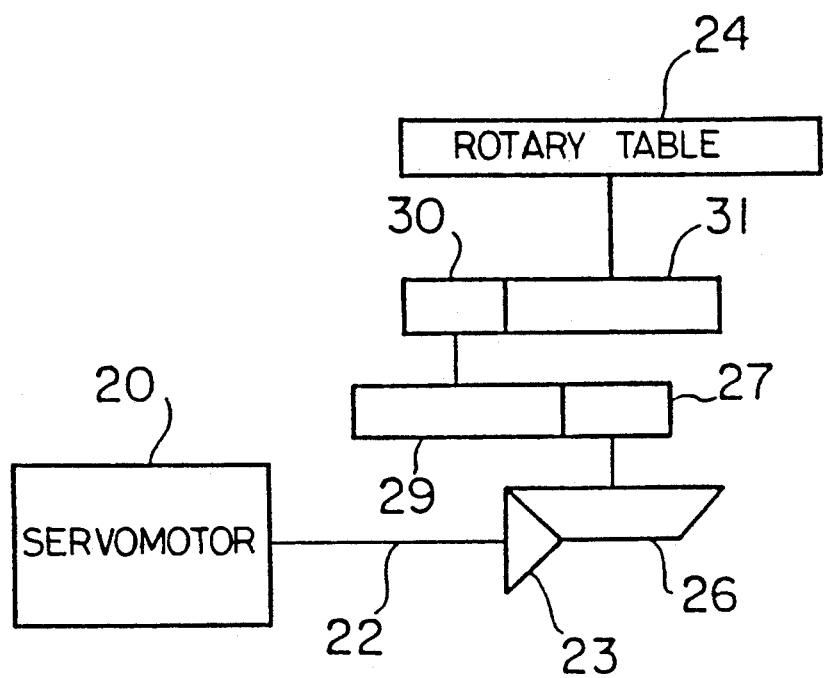
F I G. 8

GEAR PITCH ERROR CORRECTING SYSTEM FOR NUMERICAL CONTROL APPARATUS

TECHNICAL FIELD

The present invention relates to a gear pitch error correcting system for a numerical control apparatus, and more particularly, to a gear pitch error correcting system for a numerical control apparatus used for a machine tool including at least one pair of gears provided in a transmission line through which the rotating force of a servomotor is transmitted to a driven member.

BACKGROUND ART

In many cases, machine tools in which the kinematic control of a tool and a worktable is executed by a numerical control apparatus (CNC) include at least one pair of gears for changing speeds or rotational directions, arranged in a transmission line through which the rotating force of a servomotor is transmitted to a driven member such as the worktable.

If, however, even one pair of gears is provided in the transmission line for transmitting the rotating force of the servomotor to the driven member, pitch errors in the gears affect the kinematic control of the driven member, and thus the positioning accuracy is lowered.

Therefore, a gear pitch error correction is conventionally executed in numerical control apparatuses for machine tools including at least one pair of gears arranged in the transmission line, via which the rotating force of a servomotor is transmitted to a driven member. This gear pitch error correction is carried out, for example, on the basis of error amounts each previously measured in units of predetermined angles as a value between an actual amount of rotation of a rotary table and a target amount of rotation, when a force corresponding to a rotation of the predetermined angle has been applied to the rotary table as the driven member by the servomotor.

To carry out a precise correction by the above-mentioned gear pitch error correction procedure, however, the rotational angle pitch for measuring each error amount must be made smaller, to thereby permit a large number of correction points to be used for the pitch error correction, and therefore, correction value data must be prepared for each of many correction points. Accordingly, to enhance the precision of the pitch error correction, an increased amount of correction value data is required, and thus the capacity of a memory for storing the correction value data must be increased.

To eliminate the above drawbacks of the conventional gear pitch error correction, the inventor made an intensive study of the gear pitch error correction procedure, and as a result, found that, since the gear pitch error is caused by pitch errors and shape errors of each gear, a precise gear pitch error correction can be made by determining the gear pitch errors of the individual gears and then superimposing these errors, to thus eliminate the need for the use of a large amount of correction value data associated with numerous correction points.

DISCLOSURE OF THE INVENTION

An object of the present invention is to provide a gear pitch error correcting system for a numerical control apparatus by which a gear pitch error correction can be made based upon the findings of the above-described intensive study, without the need for a large amount of correction value data, i.e., the need for a large memory capacity for storing the correction value data.

To achieve the above object, the present invention provides a gear pitch error correcting system for a numerical control apparatus used for a machine tool including at least one pair of gears provided in a transmission line through which a rotating force of a servomotor is transmitted to a driven member, the system comprising a nonvolatile memory for storing pitch error correction data related to the respective gears, the pitch error correction data for the respective gears individually including gear pitch error correction values each corresponding to a predetermined gear angle and collectively covering one rotation of the corresponding gear, a current position register for storing data representing a current position of the driven member, pitch error computing means for referring to the current position register and superimposing gear pitch error correction values of the respective gears corresponding to rotational angles of the gears, to thereby obtain a superimposed pitch error correction value, and an adder for adding the superimposed pitch error correction value to an interpolation pulse output by an interpolating means.

The gear pitch error correction values for the individual gears, which each correspond to a predetermined gear angle and collectively cover one rotation of the corresponding gear, are stored in the nonvolatile memory. The pitch error computing means refers to the current position register, reads out pitch error data corresponding to the current position from the nonvolatile memory, and adds up the retrieved data to obtain a superimposed pitch error correction value. The superimposed pitch error correction value and an interpolation pulse from the interpolating means are then added together by the adder, to obtain an output pulse which has thus been subjected to the pitch error correction.

Accordingly, even with a relatively small number of gear pitch error correction values for the individual gears, a gear pitch error correction can be precisely executed in proportion to the superimposing of the gear pitch error correction values of the respective gears.

BRIEF DESCRIPTION OF THE DRAWINGS

FIG. 1 is block diagram showing an example of a processing of a position command signal in a gear pitch error correcting system for a numerical control apparatus according to the present invention;

FIG. 8 is a diagram schematically illustrating another example of a drive system for a rotary table to which the gear pitch error correcting system for a numerical control apparatus according to the present invention is applied.

BEST MODE OF CARRYING OUT THE INVENTION

An embodiment of the present invention will be described in detail with reference to the accompanying drawings.

Figure 7:
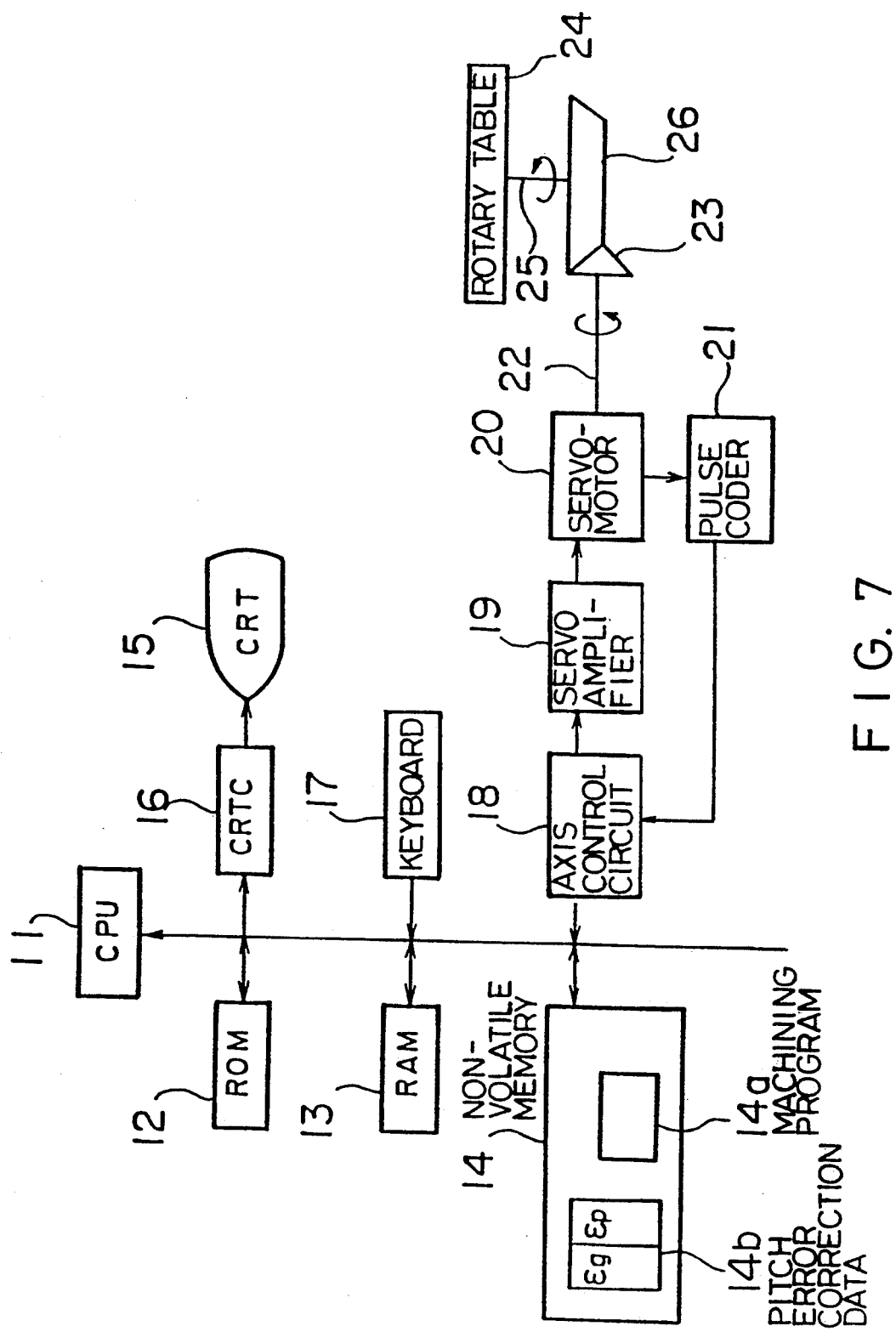
FIG. 7 is a block diagram showing an example of hardware of a numerical control apparatus by which the gear pitch error correction according to the present invention is executed.

FIG. 7 is a block diagram of hardware of a numerical control apparatus by which gear pitch error correction is executed according to the present invention.

The numerical control apparatus is a computer numerical control (CNC) apparatus, and comprises a CPU 11 including a microprocessor, a ROM 12 for storing a system program, a RAM 13, a nonvolatile memory 14 for storing a machining program 14a and pitch error correction data 14b used for a gear pitch error correction described later, a CRT control circuit 16 for carrying out a control of a display of a CRT 15 as a display unit, a keyboard 17 for generating a user command when manually operated, and an axis control circuit 18.

The axis control circuit 18 is supplied with a position command signal from the CPU 11 and a signal representing the rotational position of a servomotor 20 as a feedback signal from a pulse coder 21, and carries out a feedback processing to supply a serve control command signal to a servo amplifier 19. The servo amplifier 19 amplifies the servo control signal from the axis control circuit 18, and drives the servomotor 20 accordingly.

A small bevel gear 23 is attached to an output shaft 22 of the servomotor 20 and is in mesh with a large bevel gear 26 attached to a rotary shaft 25 of a rotary table 24. Accordingly, the rotation of the output shaft 22 of the servomotor 20 is transmitted to the rotary shaft 25 through the engaged small and large bevel gears 23 and 26, and thus the rotary table 24 is rotated about the axis of the rotary shaft 25.

The position command signal supplied from the CPU 11 to the axis control circuit 18 is a control signal which has been subjected to a gear pitch error correction relating to the small and large bevel gears 23 and 26, and this gear pitch error correction is executed by software on the basis of the pitch error correction data 14b prestored in the nonvolatile memory 14.

Figure 4:
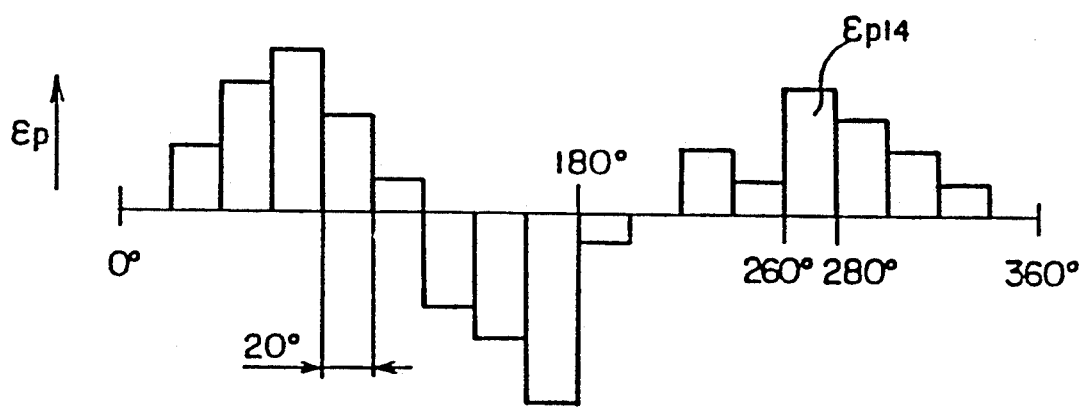
FIG. 4 and FIG. 5 are graphs showing gear pitch error correction values for respective gears used in the gear pitch error correction according to the present invention.
Figure 5:
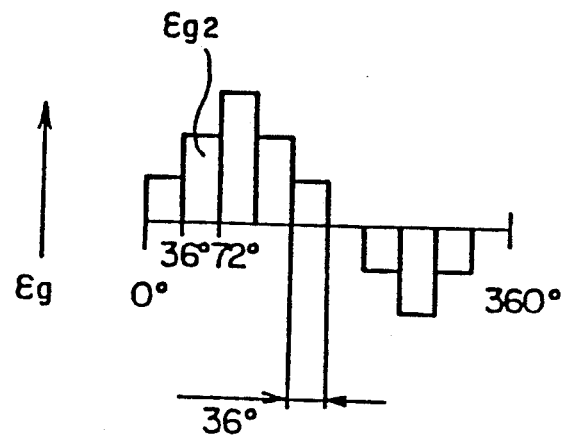

The pitch error correction data 14b is composed of eighteen first gear pitch error correction values $\epsilon p$ and ten second gear pitch error correction values $\epsilon g$. The eighteen first gear pitch error correction values $\epsilon p$ each correspond to a predetermined angle, which in this embodiment is 20°, of the large bevel gear 26, and thus collectively cover one complete rotation of the large bevel gear 26, i.e., the rotary table 24, as shown in FIG. 4, and the ten second gear pitch error correction values $\epsilon g$ each correspond to a predetermined angle, which in this embodiment is 36°, of the small bevel gear 23, and thus collectively cover one complete rotation of the small bevel gear 23, as shown in FIG. 5. These gear pitch error correction values are obtained through a precise measurement of each machine.

In this embodiment, the reduction gear ratio of the small and large bevel gears 23 and 26 is 18:1. Accordingly, one rotation of the small bevel gear 23, causes the large bevel gear 26 to rotate through an angle of 20°, and this angle is employed as a data pitch for the first gear pitch error correction values $\epsilon p$. Since the reduction gear ratio of the small and large bevel gears 23 and 26 is 18:1, a 36-degree rotation of the small bevel gear 23 corresponds to a 2-degree rotation of the large bevel gear 26, and the rotary table 24. Therefore, by carrying out a gear pitch error correction while superimposing the first gear pitch error correction values $\epsilon p$ on the second gear pitch error correction values $\epsilon g$, the gear pitch error correction of the rotary table 24 can be executed in units of 2°, thus using only twenty-eight gear pitch error correction values, and thereby achieving a more sophisticated gear pitch error correction by interpolation.

Figure 6:
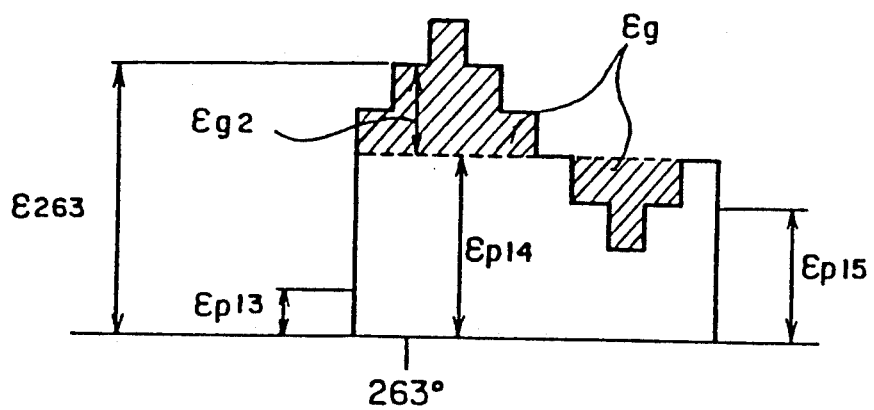
FIG. 6 is a graph showing final gear pitch error correction values obtained by superimposing the gear pitch error correction values shown in FIG. 4 on those shown in FIG. 5.

The gear pitch error correction is executed by the CPU 11, by adding up first and second gear pitch error correction values $\epsilon p$ and $\epsilon g$, both associated with the rotational angle corresponding to a target rotational angle of the rotary table 24. For example, when the target rotational angle of the rotary table 24 is 263°, a first gear pitch error correction value $\epsilon p_{14}$ for an angle between 260° and 280° is added to a second gear pitch error correction value $\epsilon g_2$ for an angle between 36° and 72°, to obtain a final gear pitch error correction value $\epsilon_{263}$, as shown in FIG. 6.

Next, an example of a processing of the position command signal when the gear pitch error correction is executed according to the present invention will be explained with reference to FIG. 1. The machining program 14a is decoded by a preprocessing means A, which then outputs the decoded position command signal to interpolating means B. The interpolating means B carries out an interpolation on the position command signal, and outputs the interpolated position command signal to an adder C and a current value register D. The current value register D stores data on the current position corresponding to the position command signal, and outputs the current position data to a pitch error computing means E. Based on the current position data supplied from the current value register D, the pitch error computing means E reads out first and second gear pitch error correction values $\epsilon p$ and $\epsilon g$, both corresponding to the current position, from among the pitch error correction data 14b, adds up these two correction values $\epsilon p$ and $\epsilon g$, and outputs the resulting gear pitch error correction value $\epsilon$ to the adder C. The adder C adds the gear pitch error correction value $\epsilon$ to the position command signal from the interpolating means B, and outputs the resulting position command signal, which has thus been subjected to the gear pitch error correction, to the axis control circuit 18 (see FIG. 7).

Figure 2:
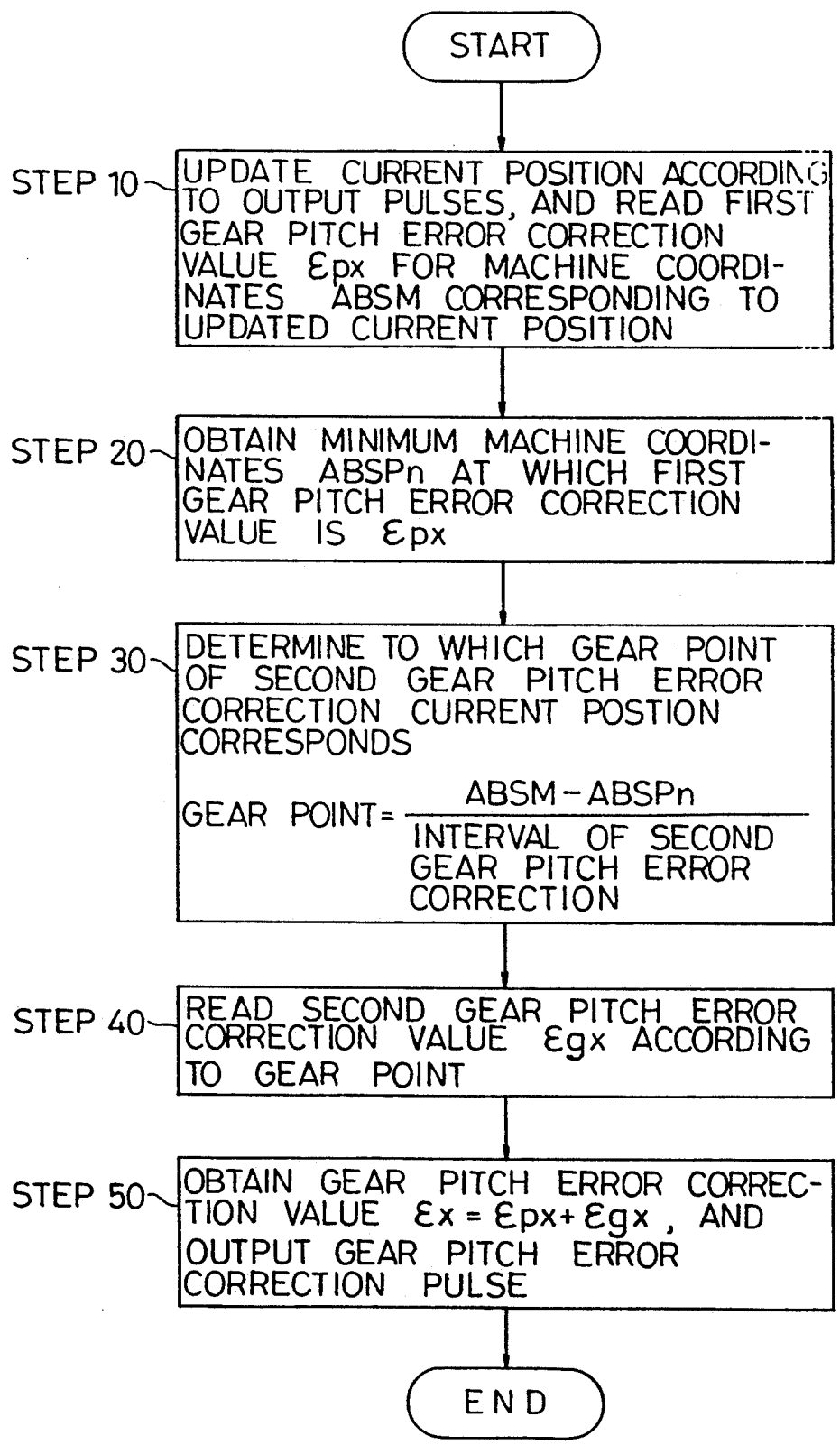
FIG. 2 is a flowchart illustrating a specific example of a gear pitch error correction for a numerical control apparatus according to the present invention.
Figure 3:
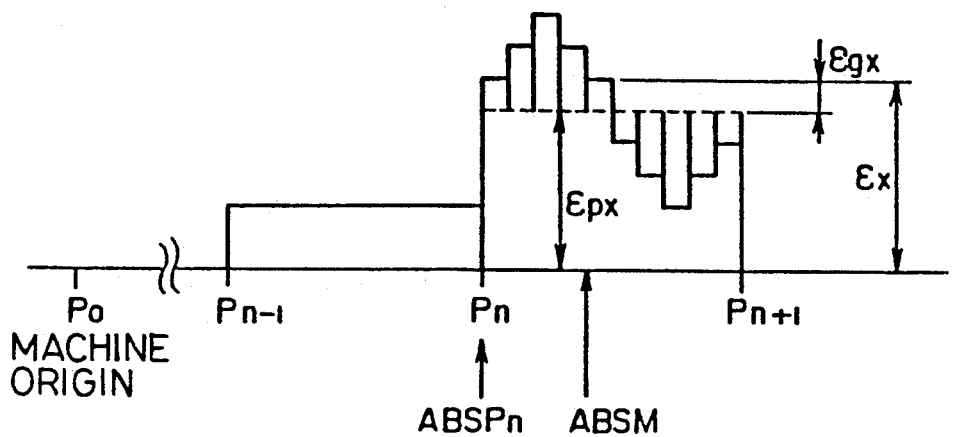
FIG. 3 is a graph showing gear pitch error correction values used in the gear pitch error correction shown in the flowchart of FIG. 2.

A specific procedure for carrying out the gear pitch error correction for a numerical control apparatus according to the present invention will be now described with reference to the flowchart of FIG. 2 and the graph of FIG. 3.

First, in Step 10, the current position is updated by an amount corresponding to output pulses, and a first gear pitch error correction value $\epsilon p\chi$ for machine coordinates ABSM corresponding to the updated current position is read from among the pitch error correction data 14b.

Next, in Step 20, minimum machine coordinates ABSPn at which the first gear pitch error correction value is $\epsilon p\chi$ are calculated.

Then, in Step 30, it is determined to which gear point of the second gear pitch error correction the current position corresponds, by the following formula:

Gear Point = (*ABSM* − *ABSPn*)/(Interval of Second Gear Pitch Error Correction)

In Step 40, a second gear pitch error correction value $\epsilon_g\chi$ for the gear pitch point obtained in Step 30, corresponding to the current position, is read from the correction data 14*b*.

In Step 50, the first gear pitch error correction value $\epsilon_p\chi$ and the second gear pitch error correction value $\epsilon_g\chi$ are added together to obtain a final gear pitch error correction value $\epsilon\chi$, and a gear pitch error correction pulse corresponding to the gear pitch error correction value $\epsilon\chi$ is output.

In the above embodiment, only one pair of bevel gears is provided in the transmission line through which a rotating force is transmitted from the servomotor to the rotary table or a driven member, but the application of the gear pitch error correcting system according to the present invention is not limited to this arrangement. For example, a plurality of pairs of gears may be provided in the transmission line, and accordingly, gear pitch error correction values are set for each of the gears of each gear pair and all correction values concerned are superimposed.

FIG. 8 shows such an example wherein two pairs of gears, one consisting of a small gear 27 and a large gear 29 and the other consisting of a small gear 30 and a large gear 31, are provided in the transmission line through which a rotating force is transmitted from the servomotor 20 to the rotary table 24. In this case, gear pitch error correction values equivalent to those for the small and large bevel gears 23 and 26 are set for each of the small and large gears 27 and 29 and the small and large gears 30 and 31, and six gear pitch error correction values of the respective gears are superimposed to obtain a final gear pitch error correction value.

Furthermore, the driven member employed in the gear pitch error correcting system of the present invention is not limited to a rotary table, and may include various types of worktables, tool heads, or the like.

As clear from the above description, in the gear pitch error correcting system for a numerical control apparatus according to the present invention, gear pitch error correction values each corresponding to a predetermined gear angle and collectively covering one complete gear rotation are prepared for each of the gears, and the gear pitch error correction values of the respective gears are superimposed to obtain a synthesized gear pitch error correction value. Accordingly, even with only a relatively small number of gear pitch error correction values for the individual gears, a gear pitch error correction can be carried out precisely in proportion to the superimposing of the gear pitch error correction values, whereby a precise gear pitch error correction is achieved without the need for a large number of correction values, and thus the machining accuracy is improved.

We claim:

1. A gear pitch error correcting system for a numerical control apparatus for a machine tool including at least two gears provided in a transmission line transmitting a rotating force of a servomotor to a driven member, comprising:
    a nonvolatile memory storing pitch error correction data related to the respective at least two gears, the pitch error correction data for each of the respective gears including gear pitch error correction values, each of the gear pitch error correction values corresponding to a predetermined gear angle and collectively representing one rotation of a corresponding gear;
    a current position register, operatively connected to said nonvolatile memory, for storing data representing a current position of the driven member;
    pitch error computing means for reading the data stored in said current position register and superimposing the gear pitch error correction values of respective gears, corresponding to rotational angles of the respective gears, determined in dependence upon the read data representing a current position of the driven member, to obtain a superimposed pitch error correction value for the current position of the driven member;
    interpolating means for outputting an interpolation pulse for deriving a corrected position of the driven member; and
    an adder, operatively connected to said pitch error computing means and said interpolating means, for adding the superimposed pitch error correction value to the interpolation pulse to derive the corrected position of the driven member.

2. A gear pitch error correcting system for a numerical control apparatus according to claim 1, wherein the driven member is a rotary table.

3. A gear pitch error correcting system for a numerical control apparatus according to claim 1, wherein said nonvolatile memory stores the pitch error correction data for each of the respective gears according to a plurality of angles of each gear, where the angles are integer fractions of 360 degrees.

4. A gear pitch error correcting system for a numerical control apparatus according to claim 3, wherein said adder adds the pitch error correction data for the at least two gears according to a nearest sum of the respective angles of the at least two gears to an angle of the current position of the driven member.

5. A gear pitch error correcting system for a numerical control apparatus according to claim 1, wherein a driven combination of the at least two gears produces a reduction ratio in the transmission line.

6. A gear pitch error correcting system for a numerical control apparatus according to claim 2, wherein a last of the at least two gears in the transmission line drives the rotary table at a 18:1 ratio.

* * * * *